United States Patent
Smotherman

Patent Number: 5,094,027
Date of Patent: Mar. 10, 1992

[54] RODENT TRAP

[76] Inventor: Robert J. Smotherman, 5430 Burkett La., Loomis, Calif. 95630

[21] Appl. No.: 718,595

[22] Filed: Jun. 21, 1991

[51] Int. Cl.⁵ ............................................. A01M 23/02
[52] U.S. Cl. ........................................ 43/60; 43/65; 43/64
[58] Field of Search ........................ 43/60, 64, 65, 66

[56] References Cited

U.S. PATENT DOCUMENTS

| | | | |
|---|---|---|---|
| 812,761 | 2/1906 | Meier | 43/65 |
| 850,123 | 4/1907 | Algate | 43/65 |
| 912,134 | 2/1909 | King | 43/65 |
| 1,074,916 | 10/1913 | Wiesen | 43/65 |
| 1,221,785 | 4/1917 | Williams | 43/114 |
| 1,246,112 | 11/1917 | Kinsley | 43/66 |
| 1,911,919 | 3/1932 | Molls | 43/66 |
| 2,193,937 | 1/1939 | Pirani et al. | 43/66 X |
| 2,231,191 | 11/1939 | Martino | 43/66 |
| 2,553,157 | 5/1951 | Worfford | |
| 3,320,692 | 11/1963 | Hellen | |
| 3,940,876 | 3/1976 | Zaccaira | 43/131 |
| 4,349,981 | 9/1982 | Sherman | 43/131 |

FOREIGN PATENT DOCUMENTS 1295921 5/1969 Fed. Rep. of Germany .......... 43/65

Primary Examiner—Richard K. Seidel
Assistant Examiner—Patty E. Hong
Attorney, Agent, or Firm—John P. O'Banion

[57] ABSTRACT

A trap (10) for rodents and the like having a triangular chamber (12) with triangular inwardly projecting flaps (14) on each end which normally close the ends of the chamber (12) and converge and form a point inside the chamber. The flaps are resiliently articulated so that they deflect to permit entry of a rodent and automatically return to their normally closed position upon entry to prevent escape. A triangular-shaped tube (20) can be inserted into the chamber to temporarily deflect the flaps for disposal of a trapped rodent or for baiting the trap.

13 Claims, 2 Drawing Sheets

Pg num 5,094,027

RODENT TRAP

BACKGROUND OF THE INVENTION

1. Field of the Invention

This invention pertains generally to animal traps, and more particularly to an apparatus for trapping rodents which will not inflict physical harm but which will permit entry of a rodent while preventing the rodent's escape.

2. Description of the Background Art

Traps for rodents and the like heretofore developed generally are either of the spring loaded type which physically engages the rodent when tripped, or of the cage type which entraps the rodent and is used either with or without poisoned bait. Traps which are of the spring type are often difficult to set, and can be accidentally tripped by household pets, children, and even adults. When they engage a rodent, the rodent often suffers if it is not instantly killed and disposal of trap with the rodent attached can be distasteful. Use of poisoned bait in cage-like traps can be dangerous because children or small animals might gain access to the poisoned bait. Additionally, the bait can fall out of the cage when it is moved thereby increasing the likelihood that poison could be inadvertently left on the ground for pets or children to find. When cage-like traps are used without poisoned bait, disposal of the live rodent can often be difficult and distasteful.

As a result of the need for safe and efficient traps, numerous animal traps have been heretofore developed. For example, U.S. Pat. No. 912,134 issued to King on Feb. 9, 1909, discloses a trap for rodents with a two piece tubular telescoping configuration. The rodent can enter an opening on either end, each opening being conical in shape and having inwardly projecting barbs which prevent the rodent from exiting. For disposal, the two pieces are separated and the rodent is dumped out. U.S. Pat. No. 3,320,692 issued to Hellen on May 23, 1967, discloses a tin can-like device having a closed end and a conical open end, the conical open end having inwardly projecting "fingers" to prevent the rodent from exiting the device. U.S. Pat. No. 2,553,157 issued to Worfford on May 15, 1951, discloses a trap fabricated from paper or cardboard having an open end with a resilient panel covering the opening. When the rodent enters the trap, the resilient panel is deflected by the rodent. The panel then closes when the rodent is inside the trap and clear of the entrance. U.S. Pat. No. 2,193,937 issued to Pirani et al. on Mar. 19, 1940, discloses a cage-like trap having a funnel-shaped entrance into an entrapping chamber and, in addition, a containing chamber inside the entrapping chamber. U.S. Pat. No. 2,231,191 issued to Martino on Feb. 11, 1941, discloses a trap attachment for a jar which has a hinged door through which a rodent can enter but not exit the jar. U.S. Pat. No. 3,940,876 issued to Zaccaira on Mar. 2, 1976, discloses a rodent trap with an entry chamber and swinging door through which a rodent can enter but not exit the trap. U.S. Pat. No. 1,074,916 issued to Weisen on Oct. 7, 1913, discloses a mouse trap having swinging vertical bars covering the entrance which permit entry but prevent exit of the mouse. U.S. Pat. No. 1,911,919 issued to Molls on May 30, 1933, discloses a trap for small animals having swinging doors on each end which allow the animal to enter the trap but prevent the animal from backing up or otherwise exiting the trap. U.S. Pat. No. 850,123 issued to Algate on Apr. 16, 1907, discloses a triangular-shaped minnow trap made from transparent celluloid and having end plates projected inwardly to from funnel-shaped ends. The ends do not completely close off, but create an opening which narrows for entrance of minnows and other small fish. While effective for catching minnows, this trap could not be used to trap rodents or other mammals because it would permit their escape.

The foregoing patents reflect the state of the art of which the applicant is aware and are tendered with the view toward discharging applicant's acknowledged duty of candor in disclosing information which may be pertinent in the examination of this application. It is respectfully stipulated, however, that none of these patents teach or render obvious, singly or when considered in combination, applicant's claimed invention.

SUMMARY OF THE INVENTION

The present invention generally comprises a triangular-shaped tube or chamber with a plurality of inwardly projecting triangular-shaped flaps on each end, the points and edges of which converge to normally close off the chamber. The flaps are articulated at the ends of the chamber, the resiliency of articulation being determined by score lines along the axis of articulation. A rodent entering the chamber deflects the flaps thereby creating an opening and, when the rodent is in the chamber, the flaps once again close off the chamber to prevent the rodent's escape therefrom. The apparatus also includes a hollow tube-like key which can be slidably inserted into the chamber through the flaps on one end to permit the rodent or poisoned bait, or both, to be dumped out so that the apparatus can be re-used. Alternatively, the entire apparatus can be disposed of along with the rodent rather than be re-used.

An object of the invention is to provide an ecologically safe rodent trap fabricated from biodegradable materials.

Another object of the invention is to provide for a rodent trap which is properly oriented when dropped into a corner.

Another object of the invention is to provide for a rodent trap which can attract and entrap additional rodents once one rodent is caught.

Another object of the invention is to provide a rodent trap in which visual verification of a rodent being present in the trap can be made without touching the trap.

Another object of the invention is to provide a rodent trap from which a rodent cannot escape.

Another object of the invention is to provide a rodent trap which will not physically harm the rodent once caught.

Another object of the invention is to safely trap rodents without danger to children or household pets from poisoned bait.

Another object of the invention is to guard against a live rodent biting or transmitting diseases to a person handling the trap.

Another object of the invention is to provide for containment of contaminated materials.

Another object of the invention is to provide for a trap which cannot be chewed through by a rodent.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DESCRIPTION OF THE PREFERRED EMBODIMENTS

Figure 1:
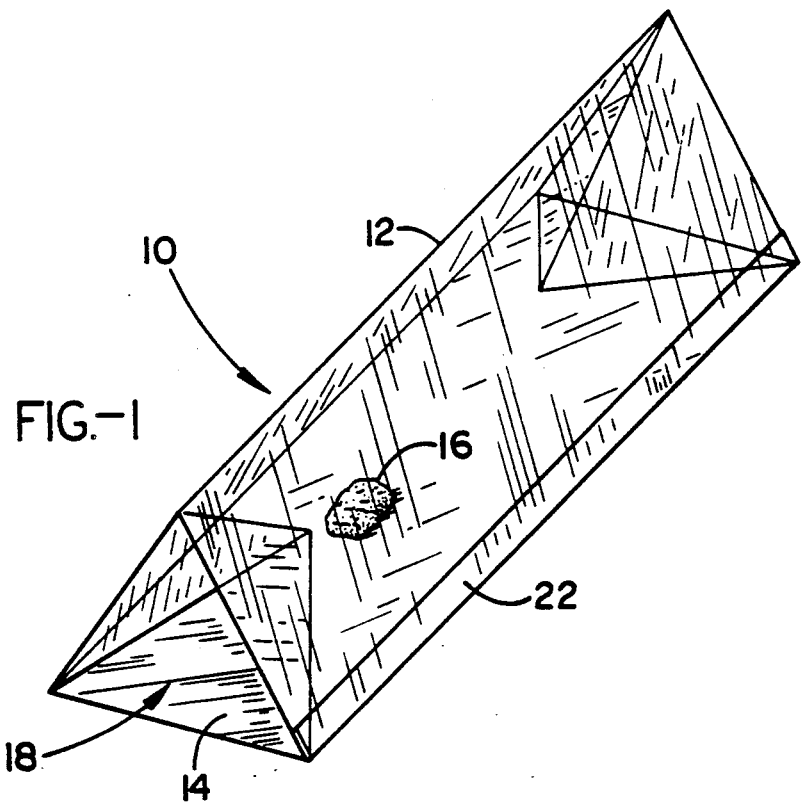
FIG. 1 is a perspective view of the present invention.

Referring more specifically to the drawings, for illustrative purposes the present invention is embodied in the apparatus generally shown in FIG. 1. It will be appreciated that the apparatus may vary as to configuration and as to details of the parts without departing from the basic concepts as disclosed herein.

Figure 4:
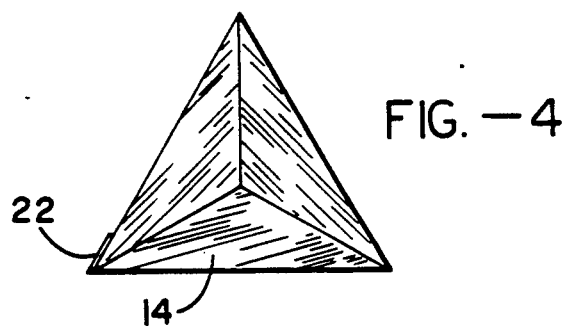
FIG. 4 is an end view of the apparatus shown in FIG. 1.
Figure 5:
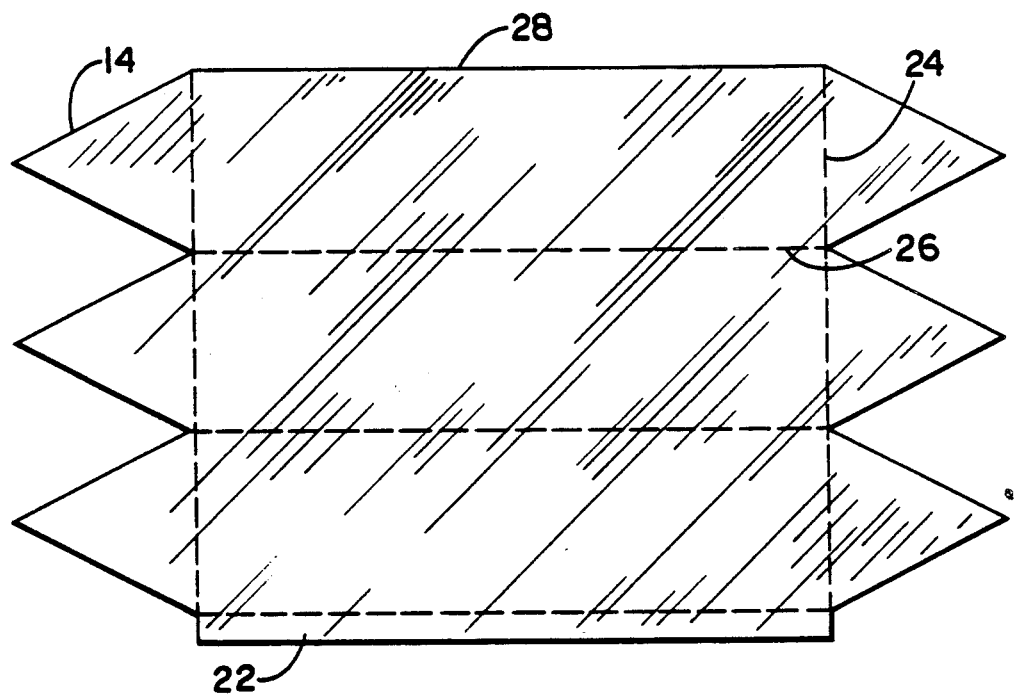
FIG. 5 is a plan view of an exemplary single, cut and scored blank from which the present invention is constructed.

FIG. 1 shows rodent trap 10 having an elongated triangular-shaped tube or chamber 12. Each end of chamber 12 includes three flaps 14 which are also triangular-shaped. The base of each flap 14 is attached to the end of chamber 12 and resiliently articulated at the inside edge so that it can swing inward, articulation being accomplished by means of score lines 24 as can be seen in FIG. 5. Referring also to FIG. 4, each flap 14 is positioned such that its sides and apex project inward and converge with the immediately adjacent flap, thereby coming to a point and closing off the ends of chamber 12.

Referring to FIG. 1 and FIG. 4, the resiliency of flaps 14 permit them to be deflected when a mouse enters passage 18, which is a trihedral-shaped recess at each end of chamber 12. The degree of resiliency of flaps 14 can be varied by changing the depth of score lines 24 and is adjusted to ensure that flaps 14 return to their normally closed position after being deflected by a rodent or other animal entering chamber 12.

Figure 2:
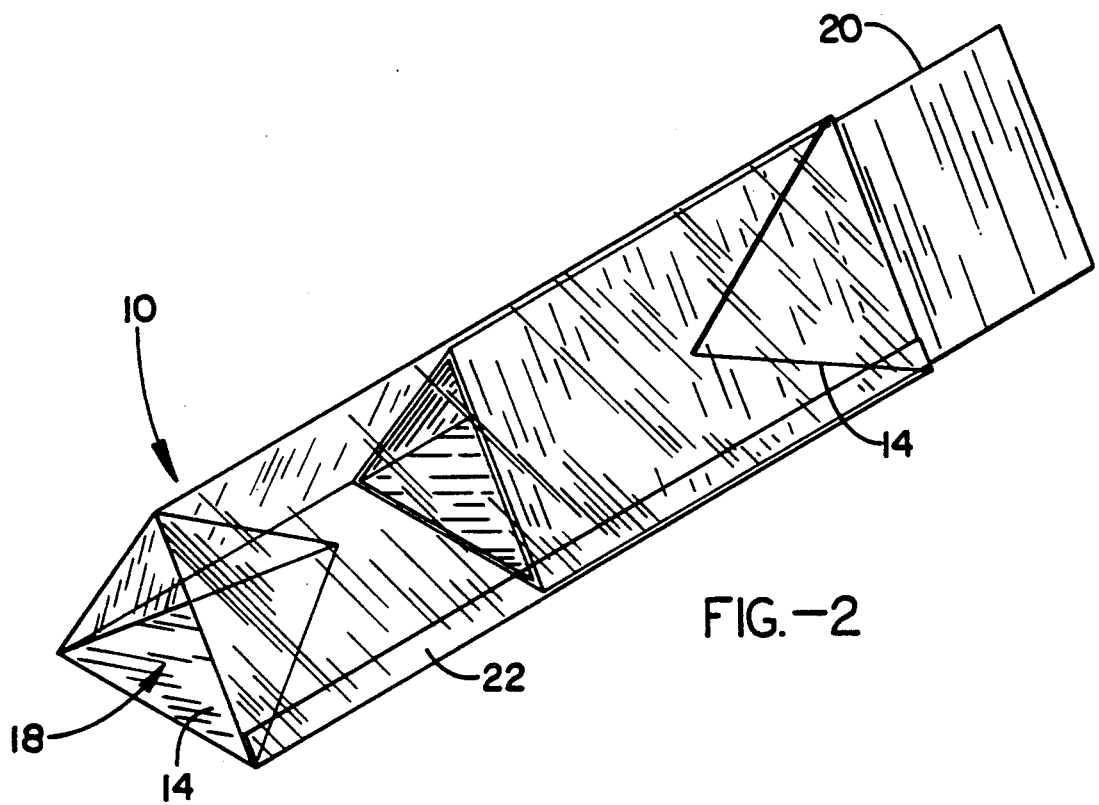
FIG. 2 is a perspective view showing a disposal tube inserted into the apparatus of FIG. 1.
Figure 3:
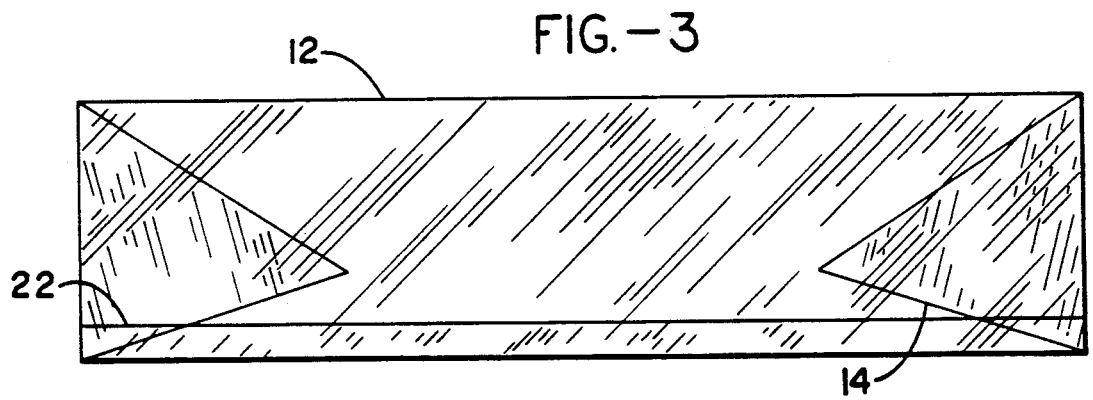
FIG. 3 is a side elevation view of the apparatus shown in FIG. 1.

Referring to FIG. 1 and FIG. 2, to bait the trap, bait 16 which can be poisoned or non-poisoned bait is inserted into chamber 12. This is accomplished by first inserting disposal tube 20 into one of the recesses 18 at the end of chamber 12. Disposal tube 20 is an elongated hollow triangular-shaped tube with outer dimensions which are smaller than the inner dimensions of chamber 12. Each end of disposal tube 20 is open. When disposal tube 20 is inserted by sliding it into chamber 12, flaps 14 are deflected and flattened against the inner walls of chamber 12. This permits bait 16 to be dropped into chamber 12 through disposal tube 20. Disposal tube 20 is also inserted when it is desired to remove or replace bait 16. When disposal tube 20 is removed, flaps 14 return to their normally closed position and bait 16 is secure in chamber 12.

Once the trap is baited it can be located in an area where a rodent is likely to be found. Because chamber 12 is triangular-shaped, the trap can be dropped in a corner or behind a piece of furniture and still land on one of its three outer walls. This ensures that the trap will be oriented in the proper position for a rodent to enter chamber 12 through recesses 18.

Recesses 18 are sized to permit a rodent to enter chamber 12 but not to permit insertion of a human hand. This feature prevents access by small children to bait 16 or a trapped rodent. Household pets are similarly prevented from gaining access to bait 16. Note also, that if the trap is upended, bait 16 will not fall out but will be contained by flaps 14.

Once a rodent is entrapped in chamber 12, the user can dispose of the entire trap. Any contamination from poisoned bait, excrement or decay is contained within chamber 12 thereby preventing the transmittal of disease to the user. And, if bait 16 was not poisoned or if the rodent is otherwise still alive, the danger of being bitten by the rodent upon removal is eliminated. Alternatively, the trap can be re-used by inserting disposal tube 20 and simply dumping out the rodent and other matter.

In the preferred embodiment, chamber 12 is transparent. It has been found that, by making chamber 12 transparent, an entrapped rodent is likely to attract another rodent. Therefore, by making chamber 12 sufficiently long to hold more than one rodent, it is possible to entrap multiple rodents even though the trap has been baited only once.

The trap is preferably made from plastic materials such as cellulose, acetate or the like so that it is not possible for a rodent to chew through chamber 12 or flaps 14. If the trap is to be disposed of along with a dead rodent, it is preferable to use a biodegradable plastic such as those made from vegetable matter.

Fabrication of the trap is straightforward and economical. For example, FIG. 5 shows a cut and scored blank 28 which can be folded to form trap 10. Score lines 26 permit the blank 28 to be folded into a triangular-shaped chamber 12. Chamber flap 22 is folded over one longitudinal edge of chamber 12 and glued or otherwise fastened to secure the folds in place. Score lines 24 permit flaps 14 to be folded and tucked into chamber 12 to form recesses 18 as can be seen in FIG. 1. Alternatively, the trap could be formed as a single assembled piece from extruded plastic material or otherwise preformed as an elongated triangular-shaped tube, in which case it would be necessary only to cut and score flaps 14. Disposal tube 20 can be fabricated in a similar manner.

Accordingly, it will be seen that this invention provides a safe and effective trap for rodents. Although the description above contains many specificities, these should not be construed as limiting the scope of the invention but as merely providing illustrations of some of the presently preferred embodiments of this invention. Thus the scope of this invention should be determined by the appended claims and their legal equivalents.

I claim:

1. A rodent trap comprising an elongated triangular-shaped hollow chamber, each end of said chamber having a plurality of inwardly projecting triangular-shaped flaps converging at a point, one edge of each said flap resiliently articulated to an edge of said chamber, the other edges of said flaps normally converging to form a trihedral-shaped recess which closes each end of said chamber.

2. The apparatus recited in claim 1, wherein a score line is positioned along the line of articulation between said flaps and said chamber, the depth of said score line varying the resiliency of said flaps.

3. The apparatus recited in claim 1, wherein said chamber is transparent.

4. The apparatus recited in claim 2, wherein said chamber is formed from a biodegradable material.

5. The apparatus recited in claim 1, further comprising a triangular-shaped hollow tube, said tube having open ends, said tube for insertion into said chamber through one end of said chamber, whereby said flaps are deflected and held in an opened position after insertion of said tube.

6. An apparatus for trapping rodents and the like, comprising an elongated hollow chamber of a triangular-shaped cross-section, each end of said chamber being normally closed by a plurality of resiliently articulating triangular-shaped flaps, one edge of each said flap attached to an edge of said chamber, said flaps projecting inwardly from the end of said chamber and converging to form a point inside said chamber.

7. The apparatus recited in claim 6, wherein a score line is positioned along the line of articulation between said flaps and said chamber, whereby the desired degree of resiliency of said flaps may be obtained by varying the depth of said score line.

8. The apparatus recited in claim 7, wherein said chamber is transparent.

9. The apparatus recited in claim 7, wherein said chamber is formed from a biodegradable material.

10. The apparatus recited in claim 7, further comprising a triangular-shaped hollow tube, said tube having open ends, said tube adapted for insertion into said chamber through one end of said chamber, whereby said flaps are deflected and held in an opened position after insertion of said tube.

11. A safety trap apparatus for rodents, comprising:
(a) an elongated triangular-shaped hollow chamber, each end of said chamber having a plurality of inwardly projecting triangular-shaped flaps, one edge of each said flap resiliently articulated to an edge of said chamber, the other edges of said flaps normally converging to close said chamber and form a trihedral-shaped recess in each end of said chamber;
(b) a plurality of score lines, said score lines positioned along the lines of articulation between said flaps and said chamber, the depth of said score lines varying the resiliency of said flaps; and
(c) a triangular-shaped hollow tube, said tube having open ends, said tube for insertion into said chamber through one end of said chamber, whereby said flaps are deflected and held in an opened position after insertion of said tube.

12. The apparatus recited in claim 11, wherein said chamber is transparent.

13. The apparatus recited in claim 12, wherein said chamber is formed from a biodegradable material.

* * * * *